United States Patent [19]

King

[11] 3,852,325

[45] Dec. 3, 1974

[54] SELECTIVE ISOMERIZATION OF PENTENENITRILES

[75] Inventor: Charles M. King, Wilmington, Del.

[73] Assignee: E. I. du Pont de Nemours and Company, Wilmington, Del.

[22] Filed: Aug. 29, 1973

[21] Appl. No.: 392,515

[52] U.S. Cl. .......................... 260/465.9, 260/465.3
[51] Int. Cl. ......................................... C07c 121/30
[58] Field of Search ................................. 260/465.9

[56] References Cited
UNITED STATES PATENTS

| 3,517,046 | 6/1970 | Inoue et al. | 260/465.9 X |
| 3,526,654 | 9/1970 | Hildebrand | 260/465.9 |
| 3,538,142 | 11/1970 | Drinkard, Jr. et al. | 260/465.9 |
| 3,686,264 | 8/1972 | Albanese et al. | 260/465.3 |
| 3,697,578 | 10/1972 | Pasquino et al. | 260/465.9 |

Primary Examiner—Joseph P. Brust

[57] ABSTRACT

A process of isomerizing geometric isomers of 2-pentenenitrile or 3-pentenenitrile by contacting the isomers at a temperature in the range of 100°–200°C. with a catalyst of the general formula $R_3CX$, such as triphenylmethyl bromide. By this process trans-2-pentenenitrile can be separated from a mixture containing mainly 3-pentenenitrile by isomerizing the trans-2-pentenenitrile to cis-2-pentenenitrile and removing the more volatile cis isomer by fractional distillation.

7 Claims, No Drawings

SELECTIVE ISOMERIZATION OF PENTENENITRILES

BACKGROUND OF THE INVENTION

The production of adiponitrile, the important polyamide intermediate, by hydrocyanation of butadiene in the presence of a zerovalent nickel catalyst to yield a number of pentenenitriles including mainly 3-pentenenitrile in cis and trans forms and further hydrocyanation of the 3-pentenenitriles to give adiponitrile is the subject of a number of patents, in particular, U.S. Pat. Nos. 3,496,215, 3,496,217 and 3,496,218. Along with production of 3-pentenenitrile in the hydrocyanation of butadiene there is also obtained varying amounts of cis- and trans-2-pentenenitriles. These 2-pentenenitriles are found to be detrimental to catalyst efficiency in the hydrocyanation of 3-pentenenitrile or 4-pentenenitrile to adiponitrile. For the purposes herein, catalyst efficiency is defined as moles of adiponitrile produced per mole of zerovalent nickel catalyst charged.

Trans-2-pentenenitrile cannot be removed satisfactorily from a mixture of pentenenitriles by fractional distillation, for example, because its boiling point is too close to that of other pentenenitriles such as 3-pentenenitrile or 4-pentenenitrile. A method has been described in U.S. Pat. No. 3,564,040 for removing trans-2-pentenenitrile in the course of hydrocyanating 3-pentenenitrile or 4-pentenenitrile with a zerovalent nickel catalyst by isomerizing trans-2-pentenenitrile to the more volatile cis-2-pentenenitrile which in turn can be removed from the mixture by fractional distillation. A shortcoming of the process described in U.S. Pat. No. 3,564,040 is that under the conditions for hydrocyanation, that is, in the presence of hydrogen cyanide and the zerovalent nickel catalyst, in addition to the isomerization of trans-2-pentenenitrile to cis-2-pentenenitrile there is also some isomerization of 3-pentenenitrile to 2-pentenenitrile. A process for the efficient removal of undesired 2-pentenenitriles from the reaction system while avoiding any further yield loss by isomerization of the desired 3-pentenenitrile intermediates to the undesired 2-pentenenitriles has therefore been sought.

SUMMARY OF THE INVENTION

It has now been found that the ratio of cis-2-pentenenitrile to trans-2-pentenenitrile or of cis-3-pentenenitrile to trans-3-pentenenitrile in a mixture of these pentenenitriles can be brought closer to their respective equilibrium ratios while avoiding appreciable carbon-carbon double bond migration in these isomers.

The process involves contacting the pentenenitrile mixture at a temperature in the range of 90° to 200°C., preferably 95° to 150°C., with from 1 to 40% by weight, based on the weight of the pentenenitriles, preferably 2 to 20% by weight, of a catalyst consisting essentially of a compound of the formula $R_3CX$ wherein R is an aryl radical having up to 18 carbon atoms and X is of the group consisting of —H, —Cl, —Br, —I, —SH, —B($C_6H_5$)$_4$, —PF$_6$, —AsF$_6$, —SbF$_6$ and —BF$_4$. Typical aryl radicals include phenyl, tolyl, xylyl, naphthyl, and phenyl substituted with longer chain groups such as hexyl, octyl, decyl and dodecyl.

The process can be carried out batchwise or continuously and at atmospheric, subatmospheric or superatmospheric pressure. For most purposes, operation at atmospheric pressure is preferred.

The process can be used for isomerization of a wide variety of olefinic compounds possessing cis and trans configurations. It is especially useful for isomerizing the geometric 2-pentenenitrile isomers which are present as by-products in the predominantly 3-pentenenitrile feed obtained by hydrocyanation of butadiene and used in the further hydrocyanation to organic dinitriles such as adiponitrile. In this connection the trans-2-pentenenitrile, which cannot be effectively separated from desired 3-pentenenitriles because of the closeness of their boiling points, can be isomerized to cis-2-pentenenitrile, which being more volatile can be removed by fractional distillation. The cis- and trans-3-pentenenitriles can also be brought closer to their equilibrium ratio without substantial isomerization of 3-pentenenitrile isomers to 2-pentenenitrile isomers.

As indicated above, the process of this invention is especially useful in providing a more efficient and economical route to adiponitrile, an important polyamide intermediate.

DESCRIPTION OF PREFERRED EMBODIMENTS

The preferred embodiments of this invention are illustrated in the examples to follow. Analyses of the products was by gas chromatography.

The following abbreviations are used:
cis-2PN - cis-2-pentenenitrile
trans-2PN - trans-2-pentenenitrile
cis-3PN - cis-3-pentenenitrile
trans-3PN - trans-3-pentenenitrile
cis-2M3BN - cis-2-methyl-2-butenenitrile
4PN - 4-pentenenitrile Example 1

To a one-liter, dry, round-bottomed flask was added 640 ml of a 98% cis-2PN/2% trans-2PN mixture and 99.5 gms of triphenylmethyl bromide (Aldrich Chemical Co.). The reactor was stoppered, flushed with nitrogen and heated to 140°C. for 1.5 hours. The product was distilled at 60°C. and 0.1 Torr. leaving the triphenylmethyl bromide in the reactor. Analysis of the distillate showed this product to contain 45.7% cis-2PN and 53.7% trans-2PN, corresponding to a cis-2PN/trans-2PN ratio of 0.85. The cis-2PN/trans-2PN equilibrium ratio is approximately 0.84. No cis-3PN or trans-3PN was detected indicating that no carbon-carbon double bond migration had occurred.

Example 2

To a 25 ml round-bottomed flask, flushed with nitrogen was added 0.20 gm of triphenylmethyl bromide and 6.0 ml. of a 98.3% cis-2PN/1.7% trans-2PN mixture. The contents of the flask were heated with a "Glascol" mantle to 100°C. After 4 hours the composition of the product was 83% cis-2PN and 12% trans-2PN. After 27 hours the product was 59.8% cis-2PN and 33.0% trans-2PN. Again, no cis- or trans-3PN was detected.

Example 3

Following Example 1, there was added to a 50 cc round-bottomed flask 12.0 ml of pentenenitrile mixture and 0.40 gms of triphenylmethyl bromide. Analysis of the mixture prior to reaction showed 90.16% trans-3PN, 3.25% cis-3PN, 0.55% trans-2PN, 0.24% cis-2PN, 1.69% 4PN and 0.42% cis-2M2BN. After heating at 140°C. for 16 hours the product composition was 84.72% trans-3PN, 10.51% cis-3PN, 0.48% trans-2PN, 0.13% cis-2PN, 1.16% 4PN and 0.21% 2M2BN. Ratio of trans-3PN/cis-3PN was 8.05, essentially at the equilibrium value of approximately 8.0 with no indication of in-chain isomerization of 3-pentenenitrile to 2-pentenenitrile.

Following the procedures of Example 1, altering of the isomer ratio of 99.5% cis-2PN/0.5% trans-2PN (initial ratio — 199) was effected by use as catalysts $\phi_3$CCl (final ratio — 53), $\phi_3$CPF$_6$ (final ratio - 54), $\phi_3$CSH (final ratio - 40) and $\phi_3$CH (final ratio - 177).

I claim:

1. A process for isomerizing a pair of geometric isomers of the group consisting of cis- and trans-2-pentenenitrile and cis- and trans-3-pentenenitrile in a mixture of these pentenenitriles, the geometric pair initially being present in a ratio greater than 1.19 trans-2-pentenenitrile/cis-2-pentenenitrile or 8.0 trans-3-pentenenitrile/cis-3-pentenenitrile and bringing the geometric pair of isomers to its equilibrium ratio said equilibrium ratio of trans-2-pentenenitrile to cis-2-pentenenitrile being 1.19 and 8.0 for trans-3-pentenenitrile to cis-3-pentenenitrile was substantially no carbon-carbon double bond migration, which comprises contacting the mixture of pentenenitriles at a temperature in the range of 90°–200°C. with from 1 to 40% by weight, based on the weight of the pentenenitriles, of a catalyst consisting essentially of a compound of the formula R$_3$CX wherein R is an aryl radical having up to 18 carbon atoms and X is of the group consisting of —H, —Cl, —Br, —SH, —I, —B(C$_6$H$_5$)$_4$, —AsF$_6$, —SbF$_6$, —PF$_6$ and —BF$_4$.

2. The process of claim 1 wherein the isomerization is carried out at a temperature in the range of 95° to 150°C.

3. The process of claim 2 wherein the pair of geometric isomers consists of cis- and trans-2-pentenenitrile.

4. The process of claim 3 wherein R$_3$CX is triphenylmethyl bromide.

5. The process of claim 4 wherein cis-2-pentenenitrile produced by isomerization of trans-2-pentenenitrile contained in a mixture with cis- and trans-3-pentenenitriles is removed from the mixture of pentenenitriles by fractional distillation.

6. The process of claim 1 wherein the geometric isomers are cis- and trans-2-pentenenitrile.

7. The process of claim 1 wherein the geometric isomers are cis- and trans-3-pentenenitrile.

* * * * *

PO-1050
(5/69)

UNITED STATES PATENT OFFICE
CERTIFICATE OF CORRECTION

Patent No. 3,852,325         Dated December 3, 1974

Inventor(s) Charles M. King

It is certified that error appears in the above-identified patent and that said Letters Patent are hereby corrected as shown below:

Column 3, line 23, "was" should read --with--.

Signed and sealed this 8th day of April 1975.

(SEAL)
Attest:

RUTH C. MASON
Attesting Officer

C. MARSHALL DANN
Commissioner of Patents
and Trademarks